Nov. 22, 1949 — L. R. HEIM — 2,488,775
BEARING
Filed July 24, 1943
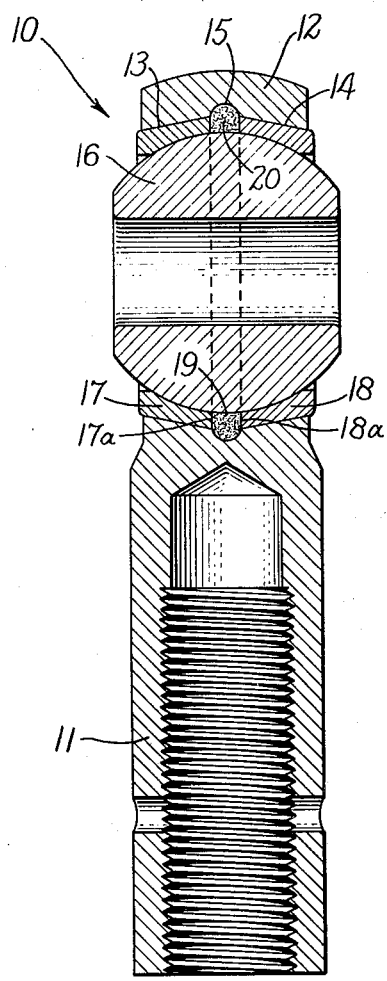
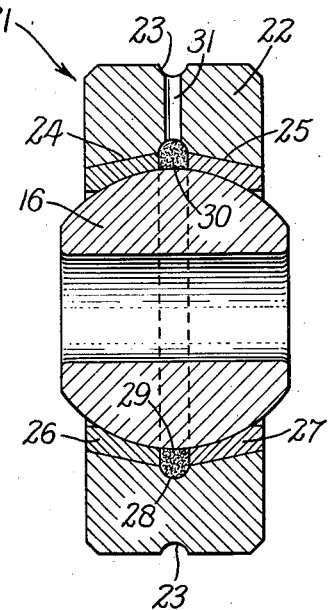
INVENTOR
Lewis R. Heim
BY
Blair, Curtis & Hayward
ATTORNEYS Patented Nov. 22, 1949

2,488,775

UNITED STATES PATENT OFFICE 2,488,775

BEARING

Lewis R. Heim, Fairfield, Conn., assignor to The Heim Company, Fairfield, Conn., a corporation of Connecticut Application July 24, 1943, Serial No. 496,261

2 Claims. (Cl. 308—72)

This invention relates to bearings.

One of the objects of this invention is to provide a bearing which is simple, inexpensive and sturdy in construction and capable of efficient use over an extended period of time. Another object is to provide a dependable, accurate bearing which is amenable to mass production manufacture in a wide range of sizes. Another object is to provide a bearing which is a standard unit, capable of wide application. Another object is to provide in a bearing of the nature disclosed efficient lubrication means permitting extended use of the bearing in inaccessible locations, without the necessity of additional lubrication. Another object is to provide a method of making a bearing having the above characteristics and which is inexpensive and may readily be practiced without resorting to highly trained personnel. Other objects will be in part apparent and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the drawing wherein I have shown two embodiments of my invention,

Figure 1 is a sectional elevation of my bearing in the form of a rod end; and

Figure 2 is a sectional elevation of my device in the form of a spherical or self-aligning bearing.

Similar reference characters refer to similar parts through the views of the drawing.

This application is a continuation-in-part of my copending applications Serial No. 460,134, filed September 29, 1942 (now Patent No. 2,366,668), Serial No. 464,612, filed November 5, 1942, now Patent No. 2,400,506, and Serial No. 490,245, filed June 10, 1943, now abandoned.

In my above-noted copending applications, I have shown several forms of so-called rod end and spherical or self-aligning bearings, characterized by features which render the bearings self-sustaining and structurally simple. Under certain conditions of use as, for example, where the rod end or self-aligning bearing, as the case may be, is substantially inaccessible for servicing subsequent to installation, I have found that conventional methods of lubrication are generally unsatisfactory and in many instances incapable of assuring extended efficient and dependable service of the unit. This is particularly true of applications where pressure lubrication is unavailable, and where the bearing is exposed to high temperature variations or pressure variations or both, which conditions result in rapid deterioration of the bearing unless adequate lubrication is provided. It is accordingly another object of my invention to provide both a bearing and a method of making the same which obviates these difficulties in a thoroughly practical manner.

In Figure 1, I have shown a rod end bearing generally indicated at 10, which comprises a drilled and interiorly threaded shank 11, from the upper end of which extends a body or eye member 12. This body 12 has a pair of tapered holes 13 and 14 machined in opposite sides thereof, the greater diameters of these holes being adjacent the center of body 12 and opening into an annular groove 15 provided for a purpose to be described. Holes 13 and 14 in body 12 receive a drilled ball 16 which is held within the body by a pair of inserts or bushings 17 and 18. Prior to their insertion within body 12, these bushings have cylindrical peripheries, but as they are forced into holes 13 and 14, respectively, under very substantial axial pressure, all as described in my above-noted copending applications, the metal of the bushings expands to lock the bushings in place so that when in position they are in the form shown.

Bushings 17 and 18 are thus pressed into body 12 of the rod end until their inner edges 17a and 18a are adjacent the opposite edges of groove 15, thus providing an annular channel 19 in which is disposed an impregnated lubricating element such as, for example, an oil wick 20. This wick is, of course, disposed within groove 15 prior to the insertion of bushings 17 and 18, and as the wick is preferably larger than channel 19 prior to installation of the bushings, the wick is substantially compressed when the bushings are pressed into place. Thus an ample amount of lubricant for ball 16 is entrapped within head 12 between the head and ball 16, and between bushings 17 and 18, where it can provide sufficient lubrication for the engaging surfaces of ball 16 and bushings 17 and 18.

Thus it may be seen that the rod end 10 is characterized by all of the advantages accruing to the structural features thereof which are set forth in greater detail in my above-noted copending applications, which advantages are considerably enhanced by the combination with such structural features of my novel method of self-contained lubrication which renders the rod end more versatile in applicability.

While rod end 10 is characterized by the many advantages noted, its structural features may advantageously be employed in the spherical or self-aligning bearing which I have shown generally at 21 (Figure 2). Thus bearing 21 comprises a preferably relatively heavy outer ring 22 provided with a peripheral oil groove 23 and with inner tapered holes 24 and 25, similar to tapered holes 13 and 14 of rod end 10 of Figure 1. These holes 24 and 25 (Figure 2) receive respectively bushings 26 and 27 which are pressed into ring 22 as heretofore described, so as to form with ball 16 and an inner groove 28 a lubricant channel 29 in which is disposed an oil wick 30. As channel 29 and oil wick 30 are annular, they are in communication with one or more oil holes 31 which are drilled into ring 22 between grooves 23 and 28. Thus, when bearing 21 is installed in a housing or the like, oil may be fed under presure or otherwise through the housing and into groove 23, from which it may flow to wick 30 by way of oil holes 31. Thus it will be seen that ball 16 is provided with ample lubrication, thus to facilitate rotation and/or oscillation of the ball in its interlocked position between bushings 26 and 27.

Thus I have provided a bearing which attains the several objects set forth hereinabove in a thoroughly practical and efficient manner.

As many possible embodiments may be made of the mechanical features of the above invention, all without departing from the scope of the invention, it is to be understood that all matter hereinbefore set forth or shown in the accompanying drawing is to be interpreted as illustrative and not in a limiting sense.

I claim:

1. A bearing of the nature of that herein described which comprises, in combination, an outer member having a hole therethrough and provided with grooves about its outer surface and in the wall of said hole, an inner rotary member mounted within said hole, a lubricant transmitting member positioned in said inner groove and contacting said inner bearing member, and means connecting said inner and outer grooves whereby said lubricant transmitting member receives lubricant from the outer groove and transmits it to the outer surface of the inner bearing member in whatever position the latter may assume, said outer member being provided with an outer cylindrical surface adapted to fit slidably within a supporting member by which it is held in position and supplied with lubricant through said outer groove.

2. A bearing of the nature of that herein described which comprises, in combination, a body member having a hole formed therein, a spherical bearing element having an opening therein disposed in said hole, bushing means secured in said hole and partially surrounding said bearing element for retaining said element in said hole, said bushing means mounting said bearing element for rotary and swinging movement with respect to said body member, and a lubricating element for lubricating said bearing element disposed between said body member and said bearing element, extending completely around said bearing element, and being locked therein by said bushing means, said body member having an exteriorly formed annular groove therein and also being provided with one or more holes extending between said groove and said lubricating element.

LEWIS R. HEIM.

REFERENCES CITED

The following references are of record in the file of this patent:

UNITED STATES PATENTS

| Number | Name | Date |
|---|---|---|
| 450,716 | Morden | Apr. 21, 1891 |
| 552,961 | Jackson | Jan. 14, 1896 |
| 558,262 | Darling | Apr. 14, 1896 |
| 773,935 | Hallock | Nov. 1, 1904 |
| 1,031,982 | Caswell | July 9, 1912 |
| 1,050,422 | Birchwood | Jan. 14, 1913 |
| 1,194,146 | Cummins | Aug. 8, 1916 |
| 1,733,931 | Arnold | Oct. 29, 1929 |
| 1,900,617 | Ricardo | Mar. 7, 1933 |
| 2,233,104 | Martinet | Feb. 25, 1941 |
| 2,260,283 | Halford | Oct. 28, 1941 |
| 2,350,482 | Venditty | June 6, 1944 |

FOREIGN PATENTS

| Number | Country | Date |
|---|---|---|
| 417,390 | France | Nov. 12, 1910 |
| 432,370 | Great Britain | July 25, 1935 |